US006834088B2

(12) United States Patent
Agami et al.

(10) Patent No.: US 6,834,088 B2
(45) Date of Patent: Dec. 21, 2004

(54) METHOD AND APPARATUS FOR CALCULATING BIT LOG-LIKELIHOOD RATIOS FOR QAM SIGNALS

(75) Inventors: Gregory Agami, Arlington Heights, IL (US); Robert John Corke, Glen Ellyn, IL (US); Ron Rotstein, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 720 days.

(21) Appl. No.: 09/804,585

(22) Filed: Mar. 12, 2001

(65) Prior Publication Data

US 2002/0159535 A1 Oct. 31, 2002

(51) Int. Cl.[7] .............................. H04L 5/12; H04L 17/22
(52) U.S. Cl. ........................ 375/324; 375/261; 375/340
(58) Field of Search ................................. 375/261, 298, 375/322, 324, 329, 332, 340, 377; 329/304

(56) References Cited

U.S. PATENT DOCUMENTS

| 6,078,626 A | 6/2000 | Ramesh |
| 6,499,128 B1 * | 12/2002 | Gerlach et al. .............. 375/341 |
| 6,594,318 B1 * | 7/2003 | Sindhushayana ............ 375/262 |

* cited by examiner

*Primary Examiner*—Betsy L. Deppe
(74) *Attorney, Agent, or Firm*—Jeffrey K. Jacobs

(57) ABSTRACT

A method and apparatus to efficiently calculate log-likelihood ratios for each bit within M-ary QAM modulated symbols transmitted in a communication system. The method and apparatus utilize characteristics of square Karnaugh mapping of the QAM symbol constellation in order to reduce the number of distance calculations needed to determine the log-likelihood ratios for each of the bits within a demodulated symbol. The reduction in the number of calculations affords significant reduction in the time needed to determine log-likelihood ratios, especially for higher order M-ary QAM systems.

16 Claims, 2 Drawing Sheets

METHOD AND APPARATUS FOR CALCULATING BIT LOG-LIKELIHOOD RATIOS FOR QAM SIGNALS

FIELD OF THE INVENTION

The present invention relates generally to communications systems, and more particularly to methods for demodulating and decoding encoded data bits transmitting in a code division multiple access (CDMA) system.

BACKGROUND OF THE INVENTION

Various communication systems are known in the art. In many systems an information signal is modulated onto a carrier signal and transmitted from a first location to a second location. At the second location, the information signal is demodulated and recovered.

Typically, the communication path used by such systems has various limitations, such as bandwidth. As a result, there are upper practical limitations that restrict the quantity of information that can be supported by the communication path over a given period of time. Various modulation techniques have been proposed that effectively increase the information handling capacity of the communication path as measured against other modulation techniques.

One modulation technique is M-ary quadrature amplitude modulation (QAM). QAM provides a constellation of an M number of modulation values (distinguished from one another by each having a different combination of phase and amplitude) wherein each constellation point represents a plurality of information bits. In order to achieve greater spectral efficiency in CDMA systems, for example, higher order modulations are used. In general, the number of bits that are represented by each symbol in an M-ary QAM system is equal to log M. For example, 16 QAM uses 16 distinct constellation points (four points in each quadrant of a complex Cartesian plane having I and Q axes) that each represent $\log_2 16$ or four information bits. Another example is 64-QAM wherein 64 constellation points each represent a combination of $\log_2 64$ or six information bits.

FIG. 1 illustrates a constellation for a 64-QAM communication system that is a map of 64 points each representing a combination of six bits on the complex plane defined by a horizontal axis representing the real portions (i.e., I) and a vertical axis representing imaginary portions (i.e., Q) of a complex number. Transmitted QAM information symbols on a communication channel (and the pilot and sync symbols as well) are discrete packets of a carrier signal modulated to convey information using both the amplitude and phase-angle displacement of the carrier from some reference. QAM information symbols are represented on the constellation of FIG. 1 as complex quantities represented as vectors having both magnitude (represented as length or distance from origin) and phase angles $\phi$ (angles measured with respect to one of the axes). In a 64-QAM system, having 64 different magnitude and phase angle combinations that correspond to 64 different possible bit patterns of six binary digits (which bits are from a serial stream of bits from an information source), each of the 64 points on the constellation is identified as representing one combination of six bits.

A vector 100 (expressed in rectangular coordinates as 5I+5Q and having a length=$(5^2+5^2)/2$ and a phase angle 102 equal to the arc tangent of 5/5 or forty-five degrees with respect to the real axis), points to the point 104 in the constellation. This point is shown in FIG. 1 as representing the series of six binary digits (i.e., 000000). Another QAM symbol represented by point 106 (−1I−1Q) is illustrated in this constellation and represents another series of six binary digits (i.e., 110011).

For any modulation scheme, the demodulator preferably should provide the decoder with the log-likelihood ratio (LLR) of the received encoded bits. As shown in FIG. 2, a receiver 200 in a CDMA system includes a log-likelihood ratio calculator 202 that receives demodulated symbols from a demodulator 204 and calculates a LLR for each bit of the demodulated symbols. The decoder 206 receives the LLR's calculated by the log-likelihood ratio calculator 202 and decodes the individual bits based on the received LLR's.

When two-dimensional modulations (i.e., having I and Q components) yield spectral efficiencies greater than 2 bps/Hz, each encoded bit cannot be mapped to an orthogonal symbol component. As a result, bit LLR's must be calculated from Euclidean distances between the demodulated symbol and the constellation symbols. The LLR of each actual $j^{th}$ bit associated with a symbol y received at time k (referred to as $y_i$) is determined by the following relationship:

$$LLR(u_{k,j}) = \log\left\{\frac{P(u_{k,j}=0|y_k)}{P(u_{k,j}=1|y_k)}\right\} \quad (1)$$

where $u_{k,j}$ is the hypothesis $j^{th}$ bit value of the symbol u at time k and P represents the probability that the $j^{th}$ bit of $u_k$ is a binary value of 0 or 1 given that $y_k$ is the received symbol. This equation reduces to the expression:

$$LLR(u_{k,j}) = \log\left\{\frac{\sum_{u_k u_{k,j}=0} P(y_k|u_k)}{\sum_{u_k u_{k,j}=1} P(y_k|u_k)}\right\} \quad (2)$$

assuming that all transmitted symbols are equiprobable. The probability P is represented by the following relationship assuming a perfect channel correction, such that the real and imaginary components are independent:

$$P(y_k|u_k)=p(y_k^r,y_k^i|u_k^r,u_k^i)=p(y_k^r|u_k^r)p(y_k^i|u_k^i) \quad (3)$$

Assuming additive Gaussian noise, the above equation reduces to the following expression:

$$P(y_k|u_k) = \frac{1}{2\pi\sigma^2}\exp\frac{-D_k^2}{2\sigma^2} \quad (4)$$

where $D_k^2$ is the squared Euclidean distance between the received symbol and the hypothesis symbol and $\sigma^2$ is the variance of the Gaussian noise. Accordingly, the squared Euclidean distance $D_k^2$ is calculated by summing the squares of the differences between the received and hypothesis symbol of both the real (r) and imaginary (i) components as represented by the following relationship:

$$D_k^2=|y_k-u_k|^2=(y_k^r-u_k^r)^2+(y_k^i-u_k^i)^2 \quad (5)$$

Substituting equation (4) into equation (2) allows calculation of the LLR based on the squared Euclidean distances and yields the following expression:

$$LLR(u_{k,j}) = \log \sum_{u_k \cdot u_{k,j}=0} e^{\frac{-D_k^2}{2\sigma^2}} - \log \sum_{u_k \cdot u_{k,j}=1} e^{\frac{-D^2}{2\sigma^2}} \qquad (6)$$

This expression may be approximated by simply taking the difference between the minimum squared distances between the received symbol and the hypothesis symbol having respective bit values of 1 and 0. Thus, equation (6) may be reduced to the following expression to approximate the LLR:

$$LLR(u_{k,j}) = \min_{u_k \cdot u_{k,j}=1} [D_k^2] - \min_{u_k \cdot u_{k,j}=0} [D_k^2] \qquad (7)$$

where the LLR of a bit $u_{k\ldots j}$ in a symbol is found by computing the difference of the minimum distance between the received symbol and a QAM constellation point where that particular bit equals one and the minimum distance between the received symbol and a QAM constellation point where that particular bit equals zero. In M-ary QAM systems the M number of symbols is equal to $2^m$ with m being the number of bits per symbol. Hence, a m number of LLR calculations are required per modulation symbol (i.e., finding the LLR for each of the m number of bits in the symbol). In order to determine the m number of LLR calculations, a M number of squared Euclidian distances ($D^2$) must first be determined between the received QAM symbol and each of the QAM symbols in the QAM constellation of symbols. Given the above mathematical operations, the calculation of LLR values for each received modulation symbol require a M number of squared Euclidean distance calculations (i.e., $D^2$ calculations, each of which involve 2 multiplication operations and an addition operation), a M number of comparison/selections per bit to determine the minimum squared Euclidean to the particular bit values of one and zero for all of the m bits in the symbol (i.e. the number of min $D^2$ values where u=1(M/2 comparison/selections and the number of min $D^2$ values where u=0 (M/2 comparison/selections), the total then multiplied by the m number of total bits in the symbol and a m number of addition operations for determining the difference between the values as shown in Equation (7) above. Accordingly, the total number of operations required per received QAM modulation symbol is 2M multiplication operations plus mM comparison/selection operation plus a M+m number of addition operations.

For purposes of illustrating reduced frame processing time, it is assumed that a clock rate for a CDMA system is 32×1.2288 MHz, or 39.3216 MHz, although the teachings of the present application are advantageous at any number of different clock rates. A multiplication operation typically requires 2 clock cycles to complete, addition operations 1 clock cycle and comparison/selection operations 2 clock cycles. Thus, for example, the time required to process a frame with 64-QAM modulation containing 5376 symbols with 6 bits per symbol, would be approximately 150 ms. This time period becomes problematic because it is much greater than the 5 to 20 ms frame turn around time required for high speed data channels. Techniques such as parallelization and pipelining may be used to reduce calculation time, but are nonetheless insufficient to reduce the receiver throughput rate down to the order of a frame turn around time in a high speed data channel.

Accordingly, there is a need for reduction of computation time for LLR's to the order of a frame time in a receiver that bit decodes QAM modulated symbols, especially for higher orders such as 64-QAM.

DETAILED DESCRIPTION OF THE PREFERRED EMBODIMENTS

The above noted problem is solved by the method and apparatus of the present disclosure. Specifically, mapping the QAM signal with a specific mapping scheme allows reduced computation time for log-likelihood ratios for each of the bits in a QAM symbol through the elimination of calculation steps based on characteristics of the predetermined specific mapping scheme. Preferably, the signal is Karnaugh mapped and Gray coded, which introduces symmetry into the constellation such that calculation steps may be eliminated based on the symmetrical characteristics of the QAM constellation.

Figure 3:
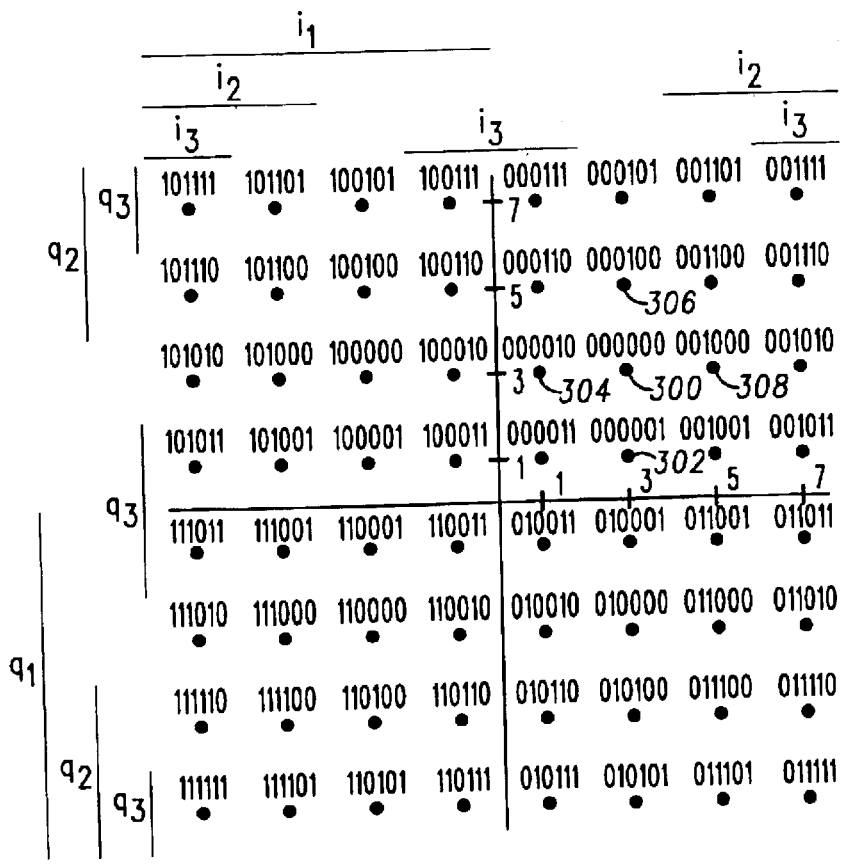
FIG. 3 illustrates a Cartesian graph showing Karnaugh mapped, Gray coded constellation symbols in a 64-QAM communication system according to the teachings of the present invention.

FIG. 3 illustrates an exemplary 64-QAM square constellation with each of the 64 points corresponding to a particular bit sequence of the 6 bits. Each of the 6 bit sequences is of the form $i_1 q_1 i_2 q_2 i_3 q_3$ labeled from most significant bit to least significant bit. Of significance is that each of the "i" bits are independent of the ordinate or Q axis and each of the "q" bits are independent of the abscissa or I axis. For example, the "i" bits change along the "I" or abscissa axis of the Cartesian graph in FIG. 3 (i.e., along the rows), but remain the same for all constellation points in the "Q" or ordinate axis direction (i.e., they change from column to column in the abscissa direction). For example, the bit $i_2$ in the second column to the right of the Q axis are all zeros, whereas all of the $i_2$ bits for the symbols in the third column from the right of the Q axis are all ones. To further illustrate this property of the Karnaugh mapped QAM signals, the lines shown at the top of the graph and the left side of the graph indicate subsets of constellation points wherein the bit is a one value whereas the absence of a line indicates a subset of points wherein the corresponding bit is a zero value. For example, the subset of points where bit $i_1$ is equal to a value of one all lie in the left half of the Cartesian plane whereas the subset of points where $i_1$ is equal to a zero value lie in the right half plane.

In the following discussion a TRUE region of the constellation for a particular bit refers to a subset of points where the value of that bit equals the desired value. The FALSE region is the compliment of the TRUE region. As an example, where $i_1$ is equal to zero, the TRUE region is the right-hand plane as shown in FIG. 3 and the FALSE region is the left-hand plane. As another example, for the subset of constellation points where bit $q_3$ equals zero the TRUE region comprises the second and third rows above and below the abscissa of the Cartesian graph in FIG. 3 and the FALSE regions comprise the first and fourth rows above and below the abscissa.

Additionally, the Karnaugh mapped QAM signals are also Gray coded such that the symbols adjoining a given symbol only change by one bit value. For example, the symbol 300 representing the bits 000000 is adjoined by four constellation points 302, 304, 306 and 308, two in the I direction and two in the Q direction, that only differ by a one bit value. For example, the point 302 located directly below has the value 000001 where only bit $q_3$ has changed in value.

The soft values of the demodulated symbols are formatted as a twos complement according to the following:

$$I = sxxx.xxx = si.f$$

where i refers to the integer portion bits, f is the fractional portion bits and s represents the sign bit. In mathematical terms I may be represented by the following expression:

$$I = -s2^{N-1} + \sum_{k=0}^{N-2} i_k 2^k + \sum_{k=1}^{M} f_k 2^{-k} = -s2^{N-1} + i + f \quad (8)$$

for numbers represented by a N number of integer bits and a M number of fractional bits. The demodulated QAM symbol is also represented in the form of I+jQ.

Particular properties and characteristics of the Karnaugh mapped QAM signal constellation illustrated in FIG. 3 afford simplified LLR calculations. One characteristic is that the constellation of FIG. 3 is mirror symmetric about the horizontal I and vertical Q axes for all bits except for the two most significant bits $i_1$ and $q_1$, which respectively have opposing values on opposing halves of the Cartesian plane. It is noted that the symbol may be Karnough mapped differently such that other bits besides the two most significant bits have opposing values on opposing halves of the plane. However, typically only two bits are not mirror symmetric and these two bits are comprised of an i bit and a q bit. Another feature is that the log-likelihood ratio of a bit $i_j$ or $q_j$ is independent of the quadrature component of the demodulated symbol. Specifically, a bit $i_j$ is independent of the Q quadrature component and a bit $q_j$ is independent of the I quadrature component. Thus, the calculation of the squared Euclidean distances as given in equation (7) previously can be greatly simplified since the calculation need only involve either horizontal or vertical distances, but not both. Hence, the log-likelihood ratio calculations for the $I_j$ and $Q_1$ bits are given respectively by the following equations:

$$LLR(i_j) = min(\Delta I_j^1)^2 - min(\Delta I_j^0)^2 \quad (9)$$

$$LLR(q_j) = min(\Delta Q_j^1)^2 - min(\Delta Q_j^0)^2 \quad (10)$$

where $\Delta I_1$ and $\Delta Q_j$ are the horizontal and vertical distances, respectively, between the demodulated symbol and a point where the bit equals a value that is either a zero or a one.

Yet another property of the Karnaugh mapped signal that affords simplification of LLR calculations is that when a demodulated symbol resides in a FALSE region for a particular bit, the nearest point will lie in the row or column closest to the border between the TRUE and FALSE regions. Thus, the distance to the nearest point will be a value of one plus the magnitude of the distance from the demodulated symbol to the border. A value of one is added here since the borders in the Karnaugh map of FIG. 3 are set halfway between the rows and columns, which are spaced at a distance of 2. Hence, the distance from rows or columns to a boundary lying halfway between them is one. However, other embodiments may utilize distances between rows and columns other than two and, thus, different values would be added to the magnitude of the distance from the demodulated symbol to the border. Additionally, if the demodulated symbol lies in a TRUE region for a particular bit the distance to the nearest point is equal to fractional part f or 1−f dependent on whether the integer portion i of the demodulated symbol component I is even or odd.

Relying on these characteristics an algorithm is then formulated according to the teachings of the present invention whereby the number of calculations to compute the LLR of each bit is reduced. In the following discussion the disclosed algorithm is for a 64-QAM constellation.

Using equation 9, discussed above, the log-likelihood ratio for the most significant bit $i_1$ is calculated using the expression:

Where $I_t$ is the two's complement formatted position of the first bit $I_1$. In this case the minimum distance between the demodulated symbol bit $I_1$ and a constellation point having a bit $I_1$, with the value of zero can be determined using the following relationships rather than calculating squared Euclidean distances for all 32 symbols where the most significant bit will be equal to zero.

First, if the value of I is less than or equal to zero it is known that the demodulated symbol lies in the left hand side of the Cartesian plane shown in FIG. 3. Thus, it follows that the minimum distance to a constellation point having the i) bit equal to zero will be one (i.e., this value is arbitrary but is preferably one as illustrated in FIG. 3 where the first column of constellation points are set at a value of one on the abscissa axis) plus the absolute value of I (i.e., the absolute value must be taken since I is less than or equal to zero or, in other words, negative).

Secondly, if the value of $I_1$ is greater than zero the minimum distance to a constellation point having a bit $I_1$ equal to zero can be easily obtained dependent on whether the integer portion of the demodulated symbol value I is even or odd. If the integer portion is odd, then the minimum value is simply equal to the fractional portion of the two's complement formatted demodulated symbol. For example, if the demodulated symbol location is at 3.9 in the I direction of the Cartesian plane then the closest constellation points will be those in the second column at a value of 3. Thus, the distance along the I axis between the demodulated symbol and the constellation point is 0.9, which is the fractional part f of I. Alternatively, if the integer portion i of the demodulated twos two's complemented symbol is even then the minimum value is equal to 1−f. For example, if the demodulated symbol lies at 4.1 in the I direction, the closest constellation points will lie in the third column at 5 along the I axis of the Cartesian plane. Thus, the distance is 1 minus the fractional portion f (i.e., 0.1) or, in other words, 0.9.

Finally, if the demodulated symbol lies beyond a value of 8 on the I axis of the Cartesian plane, then the minimum distance to a constellation symbol with the most significant bit $i_1$ equal to zero will be the difference between the value of I and the last column to the right of 7. However, since demodulated symbol values falling between 7 and 8 on the Cartesian plane are already accounted for by the previously discussed conditions, the distance is calculated by the expression 1 plus I minus 8.

The foregoing conditions are set forth mathematically where $i_1=0$ as follows:

$$\min(\Delta I_1^0) = 1 + |I| \quad I \leq 0$$
$$f \quad\quad I > 0, \text{Integer } i \text{ is odd}$$
$$1 - f \quad I > 0, \text{Integer } i \text{ is even}$$
$$1 + I - 8 \quad I > 8$$

Similarly, the minimum value of the distance between the demodulated symbol and the constellation point when the bit $i_1 = 1$ can be computed using the corollary conditions listed below.

$$\min(\Delta I_1^1) = 1 + |I| \quad I > 0$$
$$f \quad\quad I \leq 0, \text{Integer } i \text{ is odd}$$
$$1 - f \quad I \leq 0, \text{Integer } i \text{ is even}$$
$$1 + I - 8 \quad I < -8$$

It is noted that for demodulated I symbol values falling on the Q axis, the algorithm arbitrarily is set such that zero is taken as a point in the right half plane. However, zero values could alternatively be assumed to be part of values in the left hand plane.

Similarly, for finding the LLR of the bit $i_2$, further characteristics of the Karnaugh mapped constellation illustrated in FIG. 3 are utilized to reduce the number of calculations necessary to derive the LLR. Here the $i_2$ bits are the same for the outer 2 columns on both sides of the plane whereas the inner 2 columns on each side of the Q axis are the same value for those particular constellation points. Accordingly, the cutoff points are the value of 4, which lies between the two regions on either side of the Q axis. Following are the specific equations used in the algorithm to determine the minimum distances for $i_2$ values equal to zero and one, respectively, and also the equation used to determine the LLR of $i_2$ utilizing equation 9 above.

Assuming $i_2 = 0$;
$$\min(\Delta I_2^0) = 1 + (|I| - 4) \quad |I| \geq 0$$
$$f \quad\quad\quad\quad\quad |I| < 4, \text{Integer } i \text{ is odd}$$
$$1 - f \quad\quad\quad\quad |I| < 4, \text{Integer } i \text{ is even}$$

Assuming $i_2 = 1$;
$$\min(\Delta I_2^1) = 1 + (4 - |I|) \quad |I| < 4$$
$$f \quad\quad\quad\quad\quad |I| \geq 4, \text{Integer } i \text{ is odd}$$
$$1 - f \quad\quad\quad\quad |I| \geq 4, \text{Integer } i \text{ is even}$$
$$1 + (|I| - 8) \quad |I| > 8$$

Finally, to compute the last i bit $i_3$, the particular characteristics of the Karnaugh mapped constellation are again utilized to reduce the calculation of squared Euclidean distances necessary to determine the LLR for this bit. Following are the conditions used to calculate the LLR for $i_3$ for the particular Karnaugh mapped 64-QAM constellation of FIG. 3 having the characteristics of the inner and outer columns on both sides of the Q axis having the same bit values for $i_3$.

Assuming $i_3 = 0$;
$$\min(\Delta I_3^0) = 1 + (2 - |I|) \quad |I| < 2$$
$$1 + (|I| - 6) \quad |I| > 6$$
$$f \quad\quad\quad\quad\quad 2 \leq |I| \leq 6, \text{Integer } i \text{ is odd}$$
$$1 - f \quad\quad\quad\quad 2 \leq |I| \leq 6, \text{Integer } i \text{ is even}$$

Assuming $i_3 = 1$;
$$\min(\Delta I_3^1) = 1 + (|I| - 2) \quad 2 \leq |I| < 4$$
$$1 + (6 - |I|) \quad 4 \leq |I| < 6$$
$$f \quad\quad\quad\quad\quad |I| < 2, \text{Integer } i \text{ is odd}$$
$$1 - f \quad\quad\quad\quad |I| < 2, \text{Integer } i \text{ is even}$$
$$f \quad\quad\quad\quad\quad 6 \leq |I| < 8, \text{Integer } i \text{ is odd}$$
$$1 - f \quad\quad\quad\quad 6 \leq |I| < 8, \text{Integer } i \text{ is even}$$
$$1 + (|I| - 8) \quad |I| \geq 8$$

Likewise, the $Q_j$ bits are also calculated using the same techniques that are used for the $I_j$ bits except that the distances are in the Q instead of I direction. Following is an example of the equations used in the algorithm for finding the LLR of the bit $Q_1$.

Assuming $q_1 = 0$:
$$\min(\Delta Q_1^0) = 1 + |Q| \quad Q \leq 0$$
$$f \quad\quad Q > 0, \text{Integer } q \text{ is odd}$$
$$1 - f \quad Q > 0, \text{Integer } q \text{ is even}$$
$$1 + Q - 8 \quad Q > 8$$

Assuming $q_1 = 1$:
$$\min(\Delta Q_1^1) = 1 + |Q| \quad Q > 0$$
$$f \quad\quad Q \leq 0, \text{Integer } q \text{ is odd}$$
$$1 - f \quad Q \leq 0, \text{Integer } q \text{ is even}$$
$$1 + Q - 8 \quad Q < -8$$

The present discussion omits discussing the calculation of the LLR's for bits $Q_2$ and $Q_3$ since they are corollaries to the calculations for bits $i_2$ and $i_3$, respectively, discussed above.

Figure 1:
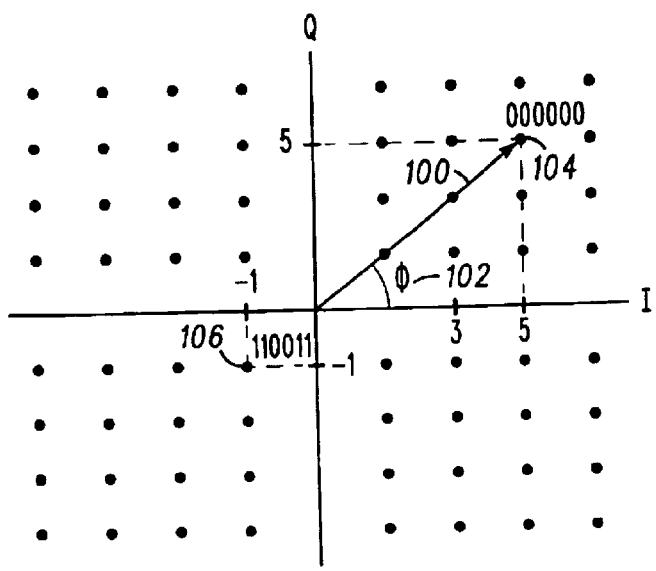
FIG. 1 illustrates a Cartesian graph showing symbols in a 64-QAM system.
Figure 2:
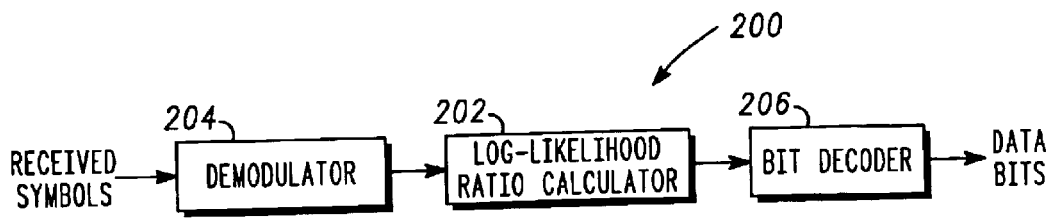
FIG. 2 illustrates a block diagram of a receiver in a communications system.
Figure 4:
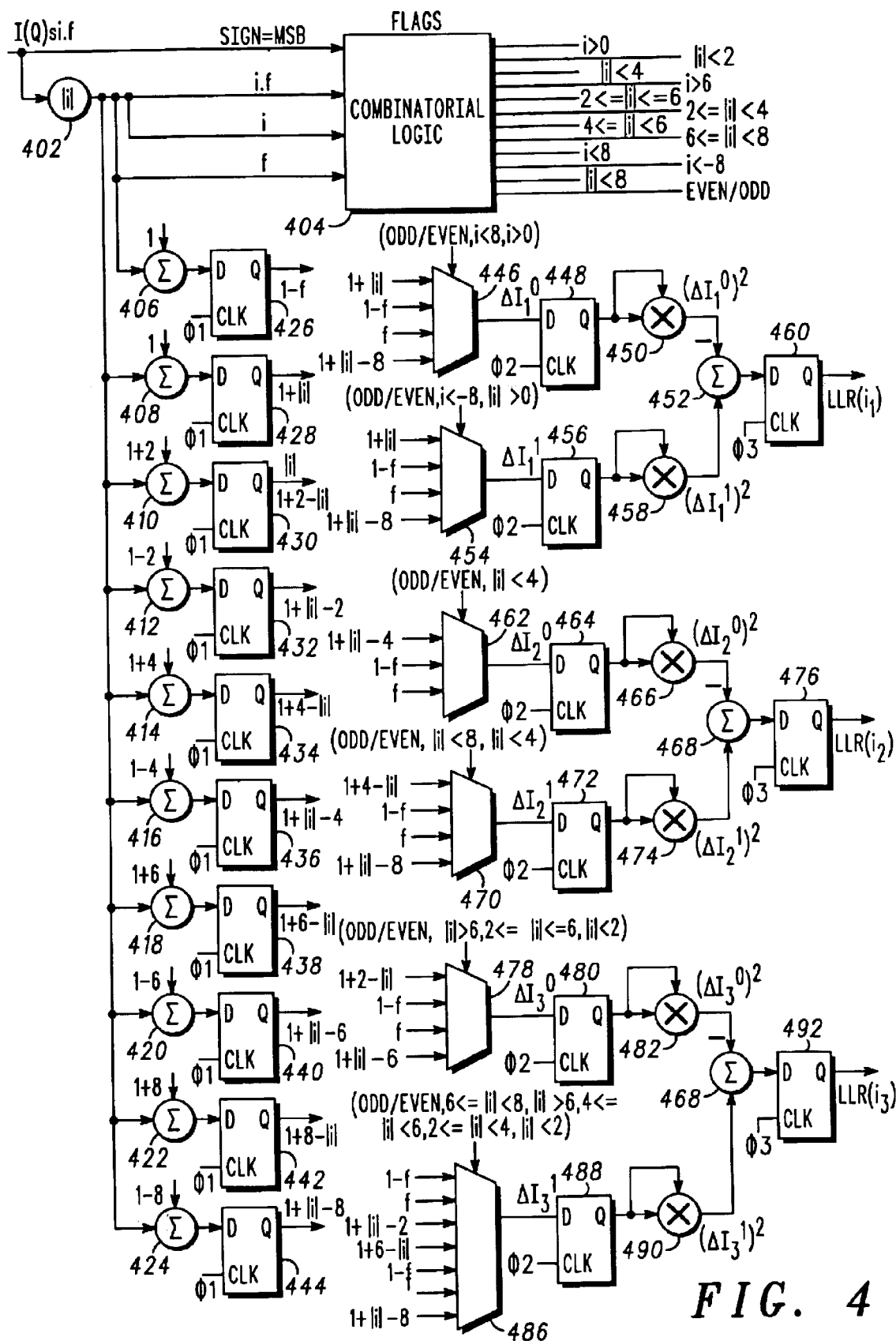
FIG. 4 illustrates a schematic of a logic circuit employed to calculate LLR values for each I component bits in a 64-QAM communication system according to the teachings of the present invention.

FIG. 4 illustrates a logic apparatus block diagram that may be used to implement the previously discussed algorithm. This apparatus may be employed within the log-likelihood ratio calculator 202 as illustrated in FIG. 2. In particular the demodulated symbol being formatted in the two's complement form of si.f is input to the logic apparatus where the individual components are split into the sign s, the integer and fractional portions i.f, the integer portion i alone and the fractional portion f alone. Prior to splitting the two's complemented symbol into its components, an absolute value block 402 is used to remove the sign portion S of the two's complemented symbol. Each of the values is input to a combinatorial logic 404, which, in turn, calculates numerous flags dependent on the values input. For example, the logic 404 outputs a flag when the value of i is greater than zero, an even or odd indication when the integer value is respectively even or odd or when the absolute value of i lies between, above or below particular numerical values. These flags are used by the logic to decide which of various inputs will be output, as will be discussed later and are essentially indicative of the position of i relative to various values along the I axis.

The logic contains a number of summing blocks 406, 408, 410, 412, 414, 416, 418, 420, 422, and 424 that all receive as an input the absolute value |I| of the received symbol. To this value, various values are either added or subtracted and the resultant values are used to input to the various decision multiplexers. Prior to input to the decision multiplexers, however, the resultants of the addition blocks are time controlled by D flip-flops being clocked with a clock it (i.e., 426, 428, 430, 432, 434, 436, 438, 440, 442 and 442). Hence, all of these values are computed in parallel simultaneously and are released to the decision multiplexers. Each of these decision multiplexers receives two or more input bits, which are comprised of the flag values output from the combinatorial logic 404. Furthermore, each of the multiplexers is used to output a value comprised of one of the inputs that represents the minimum distances $\Delta I_1^0$, $\Delta I_1^1$, $\Delta I_2^0$, $\Delta I_3^0$, and $\Delta I_3^1$.

The decisions output by the multiplexers are based on the particular flag values input and correspond to the previously discussed conditions of finding the minimum distance based on the particular bit 1, and whether the distances are to a zero or a one value. Of further note, the multiplexers are paired to output the $\Delta I_j$ values to both zero and one. For example, multiplexers 446 and 454 respectively output the values $\Delta I_1^0$ and $\Delta I_1^1$ to D clocked flip-flops 448 and 456 that are triggered by clock φ2. As can be seen in FIG. 4, similar pairings of multiplexers (e.g., 462 and 470, and 478 and 486) are arranged, respectively, to determine the ΔI values for bits $I_2$ and $I_3$). The D flip-flops 448, 456, 464, 472, 480 and 488 are all simultaneously clocked to release the values of $\Delta I_j$ to the zero or one values, respectively, to multipliers (i.e., 450, 458, 466, 474, 482 and 490) that are arranged to square the value that is input thereto. For each pairing of multipliers (i.e., 450 and 458, 466 and 474, and 482 and 490) the squared resultants are output to respective summing blocks 452, 468 and 484 that subtract the squared minimum distances thereby calculating the LLR in accordance with the relationship described previously in equation 7. Each of the summing blocks 452, 468, and 484 are input to clocked D flip-flops, which are clocked in parallel via clock φ3 to output the LLR values for the $I_j$ bits simultaneously. It is noted that the apparatus used to calculate the LLRs of the Q component is identical with the apparatus illustrated in FIG. 4.

An advantage of the configuration of FIG. 4 is that all of the operations are logically combinatorial thereby allowing execution of the operations to be clocked with a single clock and performed in a single clock cycle. Thus, the calculation of the flags output from the combinatorial logic 404 and the intermediate calculations output by the D flip-flops 426, 428, 430, 432, 434, 436, 438, 440, 442 and 444 (and similarly those for the Q component) can be performed in a single clock cycle. Similarly, the minimum distances can be derived via the multiplexers and their accompanying flag inputs also on a single clock cycle. The multiplication operation performed by the multipliers configured to square the input value requires 2 clock cycles to perform. Finally the latched LLRs are released via the D flip-flops 460, 476 and 492 in a single clock cycle from clock φ3.

Accordingly, the total number of clock cycles required to calculate the LLRs of a demodulated symbol is 5. Thus, the processing time for a 5376 symbol frame, assuming the same clock rate of 32×1.2288 MHz used previously, is approximately 0.684 milliseconds. The use of the above-described algorithm as implemented with the apparatus shown in FIG. 4, for example, reduces the time required to calculate the bit LLRs for a 5376 64-QAM symbol frame from approximately 150 milliseconds to less than 1 millisecond. Thus, feasible calculation of bit LLRs in 64-QAM modulated systems is possible even for high speed data channels.

The above-described teachings of the present application achieve a quite significant reduction in the time required to calculate bit LLRs in a 64-QAM symbol communication system affording feasible use of bit decoding in high speed data communication channels. It is noted that the present method and apparatus do not apply to only 64-QAM but any M-ary QAM modulated system where the constellation of symbols may be square Karnaugh mapped. It will be further apparent to those skilled in the art, that other embodiments other than the specific disclosed embodiments described above may be devised without departing from the fair scope of the appended claims and their equivalents.

What is claimed is:

1. A method for calculating a log-likelihood ratio for each bit of a symbol modulated and transmitted in a communication system, the symbol comprising one or more bits according to a predetermined mapping scheme having corresponding characteristics, the method comprising the steps of:

receiving the modulated symbol and demodulating the modulated symbol with the at least one receiver; and calculating a corresponding log-likelihood ratio for each of the one or more bits of the demodulated symbol by eliminating calculation steps used to determine the log-likelihood ratio using predetermined logic conditions based on the corresponding characteristics of the predetermined mapping scheme, wherein the predetermined mapping scheme includes a square Karnaugh mapping, wherein the corresponding characteristics of the predetermined mapping scheme include mirror symmetry for a constellation of symbol values about horizontal and vertical axes for all of the one or more bits in each of the symbols in the constellation except for two predetermined bits of each symbol in those symbols having more than two bits, wherein each of the two predetermined bits has opposing values for symbols on respective opposing sides of the horizontal or vertical axes, and wherein the demodulated symbol is formatted as a two's complement having a sign bit, one or more integer bits and one or more fractional bits, and wherein the predetermined logic conditions include:

a) performing intermediate difference calculations in the directions of the horizontal and vertical axes using the two's complement sign bit, the one or more integer bit and the one or more fractional bits, the difference calculations based on the asymmetric and symmetric characteristics of the symbol bits in the Karnaugh mapped symbol constellation to achieve a plurality of difference values;

b) determining two minimum distances of each bit in the received demodulated symbol to corresponding two closest constellation points of the Karnaugh mapped symbol constellation having corresponding bit values of one and zero, respectively, by selecting one or more of the plurality of difference values based on selection criterion predetermined for each particular bit of the demodulated symbol, the selection criterion based on characteristics of the Karnaugh mapping; and c) squaring the determined two minimum distances of each bit and taking the difference of the squares to obtain the log-likelihood ratio of each bit of the demodulated symbol.

2. The method according to claim 1, wherein for each of the two predetermined bits, symbols on a side of an axis have the predetermined bit set at a first binary value and remaining symbols on an opposing side of the axis have the predetermined bit set at a second binary value.

3. The method according to claim 1, wherein the predetermined mapping scheme further includes Gray coding.

4. The method according to claim 1, wherein the symbol is comprised of $\log_2 M$ bits and is modulated according to a M-ary Quadrature Amplitude Modulation scheme.

5. The method according to claim 4, wherein the M-ary Quadrature Amplitude Modulation scheme has 64 symbols and each symbol is comprised of six bits.

6. An apparatus for determining a log-likelihood ratio for each bit of a demodulated symbol received by a communication system, the apparatus comprising:

a receiver portion configured to receive a demodulated symbol modulated according to an M-ary quadrature amplitude modulation;

a combinatorial logic configured to determine one or more characteristics of the received demodulated symbol;

a plurality of first additive devices each configured to perform a corresponding additive operation of a corresponding value to a portion of the received demodulated symbol and output a corresponding resultant value;

a plurality of multiplexers arranged in pairs, each of the multiplexers configured to receive particular ones of the resultant values from one or more of the plurality of first additive devices, each of the multiplexers outputting one of the input resultant values based on states of the at least one of the one or more characteristics of the received demodulated symbol as determined by the combinatorial logic;

a plurality of squaring blocks arranged in pairs corresponding to the pairs of multiplexers, each of the plurality of squaring blocks connected to a corresponding one the plurality of multiplexers and configured to square the particular resultant output by the corresponding multiplexer; and a plurality of second additive devices each configured to calculate a difference between outputs of a corresponding arranged pair of the plurality of squaring blocks, wherein the difference represents a log-likelihood ratio for a particular bit of the demodulated symbol.

7. The apparatus according to claim 6, wherein the demodulated symbols were modulated according to a predetermined mapping scheme that includes a square Karnaugh mapping scheme.

8. The apparatus according to claim 7, wherein the additive operations of the plurality of first additive devices are predetermined based on characteristics of the Karnaugh mapping scheme.

9. The apparatus according to claim 8, wherein the characteristics of the Karnaugh mapping scheme include mirror symmetry for a constellation of symbol values about horizontal and vertical axes for all of the one or more bits in each of the symbols in the constellation except for two predetermined bits of each symbol in those symbols having more than two bits, wherein each of the two predetermined bits has opposing values for symbols on respective opposing sides of the horizontal or vertical axes.

10. The apparatus according to claim 9, wherein for each of the two predetermined bits, symbols on a side of an axis have the predetermined bit set at a first binary value and remaining symbols on opposing side of the axis have the predetermined bit set at a second binary value.

11. The apparatus according to claim 7, wherein the predetermined mapping scheme further includes Gray coding.

12. The apparatus according to claim 6, wherein the demodulated symbol is comprised of a $\log_2 M$ number of bits.

13. The apparatus according to claim 12, wherein the M-ary Quadrature Amplitude Modulation scheme has 64 symbols each having 6 bits.

14. The apparatus according to claim 6, wherein the one or more characteristics determined by the combinatorial logic include a sign of the demodulated symbol and positional information of the demodulated symbol relative to axes of a Karnaugh mapped constellation of symbols and also relative to predetermined values on the axes.

15. The apparatus according to claim 6, wherein the plurality of first additive devices are arranged in parallel and have outputs controlled by a first clock;

the plurality of multiplexers are arranged in parallel and have outputs controlled by a second clock; and the plurality of second additive devices are arranged in parallel and have outputs controlled by a third clock.

16. The apparatus according to claim 6, wherein the demodulated symbol value is formatted as a two's complement having a sign bit, one or more integer bits and one or more fractional bits; and wherein the receiver portion is configured to separate the symbol value into the sign bit, the one or more integer bits, the one or more fractional bits and derive an absolute value of the symbol.

* * * * *